United States Patent
Papavassiliou et al.

(10) Patent No.: US 7,547,422 B2
(45) Date of Patent: Jun. 16, 2009

(54) CATALYTIC REACTOR

(75) Inventors: Vasilis Papavassiliou, Williamsville, NY (US); Shawn Michael Cecula, Lewiston, NY (US); Perry Pacouloute, Williamsville, NY (US); Thomas Edward Gajewski, North Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 516 days.

(21) Appl. No.: 11/373,239

(22) Filed: Mar. 13, 2006

(65) Prior Publication Data

US 2007/0212276 A1    Sep. 13, 2007

(51) Int. Cl.
*B01J 8/00* (2006.01)
*C01B 3/24* (2006.01)

(52) U.S. Cl. ............ 422/194; 422/198; 422/211; 422/215; 422/222; 48/127.9; 48/198.7

(58) Field of Classification Search ............ 422/198, 422/191, 211, 222, 190, 194, 215; 48/212, 48/127.9, 198.7; 431/175
See application file for complete search history.

(56) References Cited

U.S. PATENT DOCUMENTS

| | | | |
|---|---|---|---|
| 4,865,820 A | 9/1989 | Dunster et al. | 422/220 |
| 5,522,723 A * | 6/1996 | Durst et al. | 431/328 |
| 5,886,056 A | 3/1999 | Hershkowitz et al. | 518/703 |
| 6,267,912 B1 | 7/2001 | Hershkowitz et al. | |
| 6,471,937 B1 | 10/2002 | Anderson et al. | 423/659 |
| 6,787,115 B2 * | 9/2004 | Goebel | 422/198 |
| 7,255,840 B2 * | 8/2007 | Papavassiliou et al. | 422/190 |
| 7,261,750 B1 | 8/2007 | Autenrieth et al. | |
| 2004/0096391 A1 * | 5/2004 | Franz et al. | 423/650 |

FOREIGN PATENT DOCUMENTS

| | | |
|---|---|---|
| EP | 0 303 439 B1 | 10/1992 |
| WO | WO 98/49095 | 11/1998 |
| WO | WO 03053559 | 7/2003 |

* cited by examiner

*Primary Examiner*—N. Bhat
(74) *Attorney, Agent, or Firm*—David M. Rosenblum

(57) ABSTRACT

A catalytic reactor having a mixing section connected to a downstream reaction section containing a catalyst to promote a reaction of oxygen and a hydrocarbon fed to the catalytic reactor. The mixing section is provided with a flame arrestor to prevent a stable flame from propagating should any reaction of oxygen and hydrocarbons occur during mixing. The flame arrestor permits flow in both axial and radial directions to promote mixing. Baffle elements and a downstream static mixer can also be used. The catalyst is preferably in the form of monolithic blocks enclosed by a ceramic tube that is maintained as a unitary catalyst assembly that can be removed for replacement and installation of the catalyst as a single unit.

10 Claims, 3 Drawing Sheets

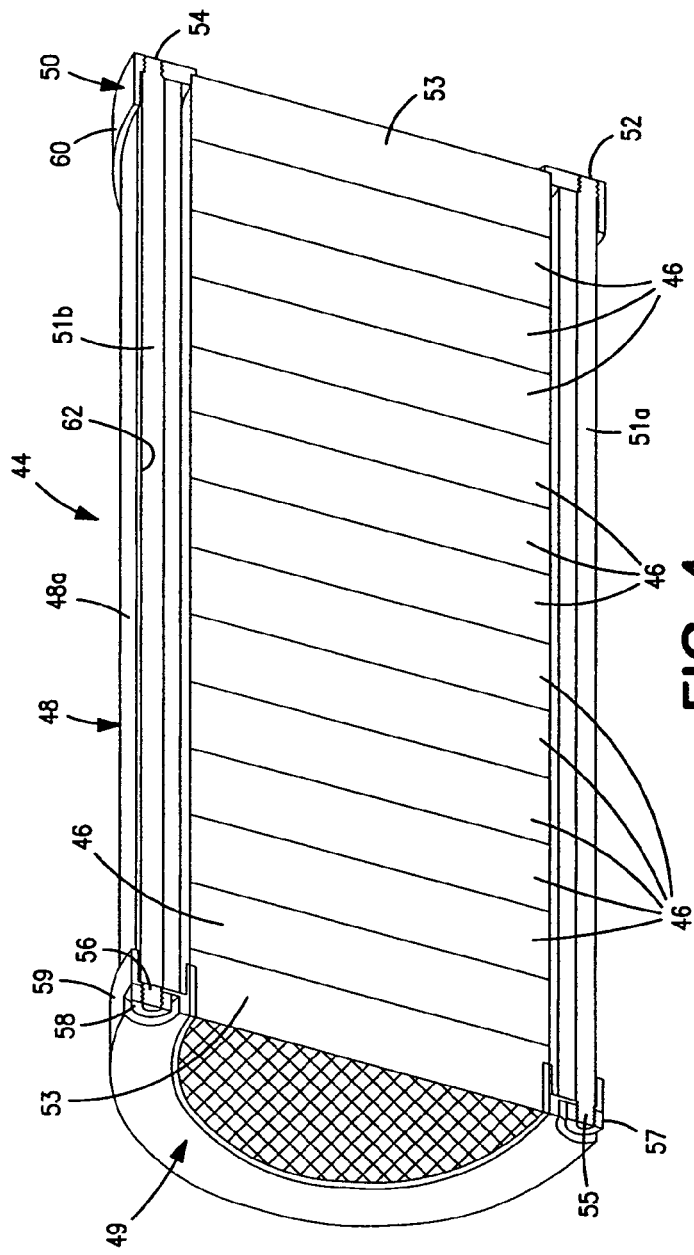
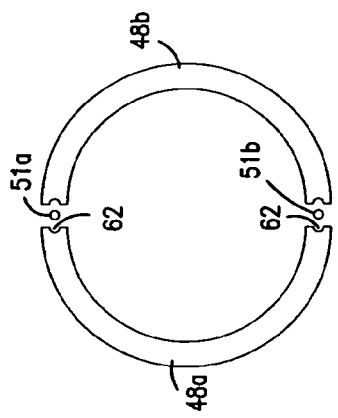
FIG. 4
FIG. 4A

CATALYTIC REACTOR

FIELD OF THE INVENTION

The present invention provides a catalytic reactor having a mixing section to mix an oxygen containing gas with a hydrocarbon containing gas to produce a mixture and a downstream reaction section to catalytically react the mixture to produce a product. More particularly, the present invention relates to such a reactor in which the mixing section is provided with a flame arrestor to prevent formation of a stable flame should hydrocarbons within the mixture somehow ignite.

BACKGROUND OF THE INVENTION

There have been a variety of reactors that have been proposed to react oxygen with a hydrocarbon containing stream to produce a synthesis gas product containing hydrogen and carbon monoxide. Typical reactors are partial oxidation reactors in which the hydrocarbon species are mixed with an oxygen containing gas and are partially oxidized with the aid of a partial oxidation catalyst. Other reactors also inject steam so that the hydrocarbons can be reacted by known steam methane reforming reactions. In such a reactor, the partial oxidation reactions being exothermic provide the heat to support the endothermic heating requirements of the steam methane reforming reactions. Such a reactor is known as an autothermal reactor. Yet further reactors are multi-tubular reactors used for exothermic selective oxidation reactions for production of ethylene oxide, vinyl acetate, and other oxygenated hydrocarbons.

Reactors that are designed for partial oxidation reactions contemplate an operation in which the proportions of hydrocarbons and oxygen are selected to produce a substantially complete conversion of the hydrocarbons to a hydrogen and carbon monoxide containing synthesis gas. As such, there exists such a significant content of oxygen that autothermal ignition of the hydrocarbons is possible. Reaction of the hydrocarbons and the oxygen prior to the catalyst for any reason is particularly not desirable because it results in unwanted consumption of the reactants by full oxidation thereof resulting in a fall-off in required production rates and potential carbon deposition on the catalyst. This problem is exacerbated in such reactors because oxidation reactions are occurring directly downstream in the reaction section at high temperature and thus, combustion within the reaction section can propagate an unwanted reaction within the mixing chamber. In order to combat this problem, reactors have been designed such that the reactants, namely, hydrocarbons and oxygen are mixed in a mixing section so rapidly that they do not have time to react before a reaction section is reached containing a catalyst to promote the intended reaction.

An example of a reactor that is designed to prevent combustion of the reactants in the mixing section can be found in U.S. Pat. No. 4,865,820 that discloses a partial oxidation reactor in which the mixing chamber is provided with narrow passageways having straight throat sections in which either of the reactant streams is introduced to mix under turbulent conditions with the other of the reactant streams through orifices formed in the narrow passageways. The resultant turbulent flow has a velocity that exceeds that of any flame propagating due to flash-back from the reactor. U.S. Pat. No. 5,886,056 has provision for injecting reactant gases at high velocity through a plurality of isolated passageways in an injector manifold to reduce the residence time of the reactants within the mixing section to prevent the undesirable reaction of the reactants within the mixing section. In U.S. Pat. No. 6,471,937, hot reactant gases are introduced into a nozzle contained in a mixing chamber to produce a supersonic velocity jet that will entrain another component of a reactive mixture into the jet. Reactant mixtures are then introduced into a reaction zone. The residence time within the mixing chamber sufficiently brief that the reactants do not have time to react before entering the reaction zone.

The problem with all of such reactors is that they are not amenable to an operation in which it is not desired to completely react the hydrocarbons to a synthesis gas. For example, a catalytic partial oxidation reactor can be utilized as a pre-reformer to react higher order hydrocarbons to primarily methane. When such a reactor is used as a pre-reformer, the amount of oxygen on a volume basis that is introduced relative to the hydrocarbon feed is a fifth or less. This is to be compared to a reactor designed for complete reaction of the hydrocarbons to carbon monoxide and hydrogen in which the ratio would be a half or more. As such, devices that are described in the patents listed above and that all depend upon entrainment will not work with such a small proportion of oxygen. In any case, the mechanism of possible combustion of the hydrocarbons is completely different in the pre-reforming case in that as the reactants are being mixed, a flammable mixture is produced. However, once mixing is complete there does not exist enough oxygen to produce a flammable mixture. Hence, combustion can be produced upon mixing, but there exists little danger of combustion once mixing is complete. Typically in such applications the oxygen is introduced as a high velocity jet designed to entrain the flammable gas quickly so that the flammable mixing zone is minimized. Flame arrestors can be also placed after the mixing zone to reduce the effect of overheating in the event the mixture accidentally ignites. These flame arrestors consist of a bundle of narrow passages that only permit axial flow.

A further problem in any reactor containing a catalyst is that eventually, the catalyst will have to be replaced. This can be a very arduous task that can take days to complete. In U.S. Pat. No. 4,865,820, an attempt is made to segregate the catalyst from insulation that serves to insulate the reactor walls from the high temperature reactions occurring within such reactor by provision of a reactor having an outer pressure vessel that contains insulation, an inner refractory and a metal sheath that contains the catalyst. The top mixing section can be removed to allow retrieval and reinstallation of the catalyst when requiring replacement. Even though the catalyst is formed of monolithic blocks, retrieving and reloading the catalyst is still problematical.

As will be discussed the present invention provides a catalytic reactor in which stable flame propagation within the mixing chamber is inhibited and is designed such that the catalyst can be easily installed and replaced.

SUMMARY OF THE INVENTION

In accordance with the present invention, a catalytic reactor is disclosed that has a mixing section to mix an oxygen containing gas with a hydrocarbon containing gas and a reaction section connected to the mixing section to react a mixture of the oxygen containing gas and the hydrocarbon containing gas to produce a product.

The mixing section includes a mixing chamber having an inlet for the hydrocarbon containing gas, an oxygen injector located within the mixing chamber for injecting the oxygen containing gas into the hydrocarbon containing gas. A flame arrestor is located at least below the oxygen injector. The flame arrestor is formed of a mass of porous material that permits mixing in both radial and axial directions of said mixing chamber to promote mixing of the oxygen containing gas and the hydrocarbon containing gas. The flame arrestor is in contact with the walls of said mixing chamber such that flow of said oxygen containing gas and said hydrocarbon containing gas is constrained to pass through said flame arrestor before entering the reaction section. Thus, should combustion of the reactants occur within the mixing section of a catalytic reactor of the present invention, the propagation of the flame is inhibited. Contrary to previous designs this flame arrestor can be placed near the oxygen injection so that at least part of the mixing, which is the most dangerous part of the process is accomplished inside the flame arrestor.

The reaction section includes an inner chamber positioned to receive the mixture of the oxygen containing gas and the hydrocarbon containing gas. The catalyst is located within the inner chamber to promote the reactions involving the mixture. An outer pressure vessel is provided along with thermal insulation between the inner chamber and the outer pressure vessel. An outlet penetrates the outer pressure vessel and communicates with the inner chamber to discharge a product gas containing the product. The advantage of such an arrangement is that the catalyst and the reaction occurring therein is isolated from the insulation to prevent reaction between the insulation and the catalyst. Further, the outer pressure vessel being insulated from the inner chamber in which reactions are occurring operates at a lower temperature to allow the use of less expensive materials for such pressure vessel and a safer environment for personnel and equipment surrounding the catalytic reactor.

Preferably, the flame arrestor is fabricated from a metallic foam monolith. The metallic foam monolith can consist of layers of the metallic foam monolith and the mixing chamber can further be provided with baffle elements located between said layers to further promote mixing of the oxygen containing gas and the hydrocarbon containing gas. The oxygen injector can comprise an inlet pipe projecting into the mixing chamber and a circular distributor having openings to discharge the oxygen containing gas. If necessary, a static mixer can be located below the flame arrestor to yet further promote mixing of the oxygen containing gas and the hydrocarbon containing gas.

In order to facilitate installation and retrieval of the catalyst from the inner vessel, the catalyst can comprise a stack of monolithic blocks located within an assemblage comprising a ceramic tube and a fixture to retain the stack of monolithic blocks within the ceramic tube as a single unit so that the assemblage can be installed and retrieved from the inner vessel as a single unit. Preferably, the catalyst is of substantially cylindrical configuration and the fixture comprises two opposed end plates of annular configuration and tie rods connecting the two opposed end plates. The end plates are configured to retain the ceramic tube between the end plates and therefore the stack of monolithic blocks within the ceramic tube and between the end plates. In this regard, the ceramic tube can be separable along its length to facilitate installation of the stack of the monolithic blocks and the attachment of the end plates by the tie rods.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

FIG. 4 is a schematic, elevational view of the monolithic catalyst sections retained in the catalyst tube and a fixture retaining the catalyst tube and therefore the monolithic catalyst section as a unit assemblage; and FIG. 4A is an exploded fragmentary end view of halves of the catalyst tube showing recessed edge portions for the receipt of tie rods.

DETAILED DESCRIPTION

Figure 1:
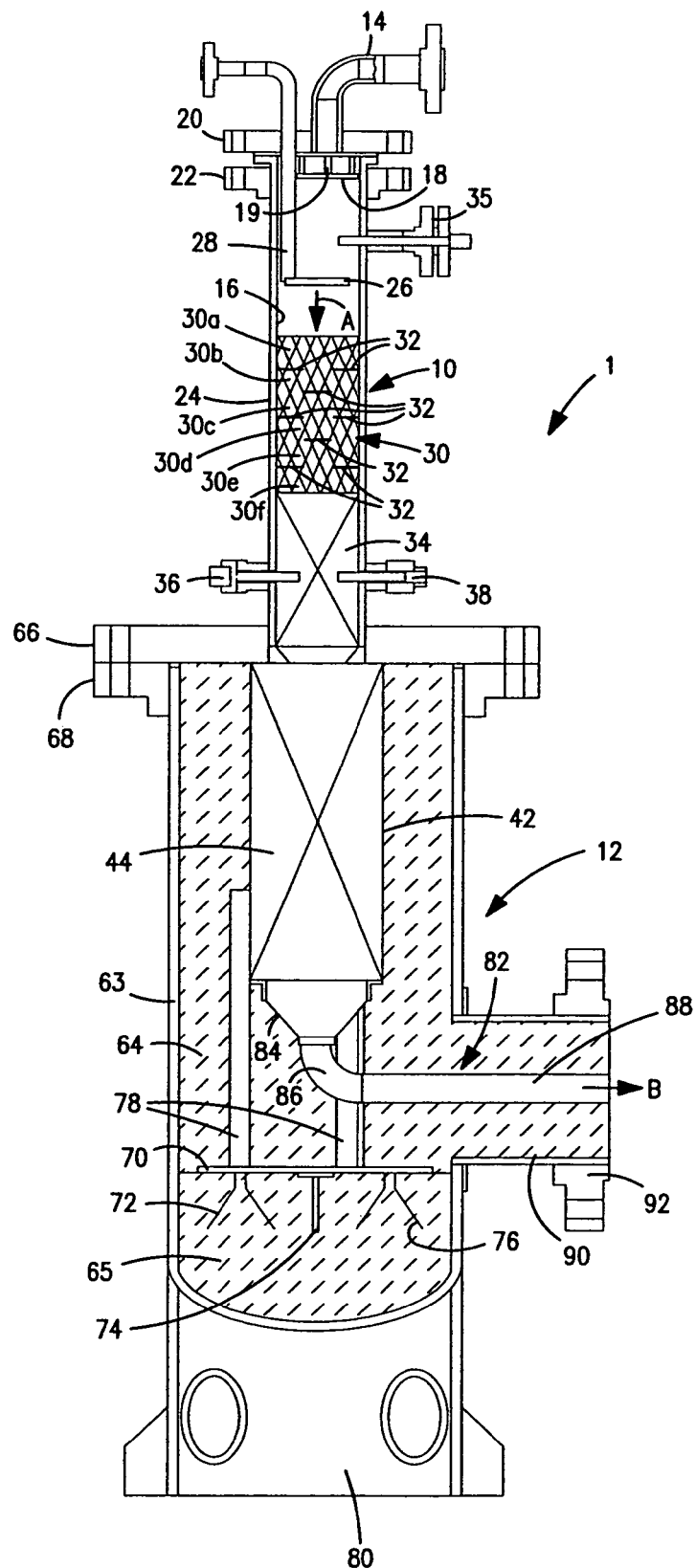
FIG. 1 is a schematic, sectional view of a catalytic reactor in accordance with the present invention.

With reference to FIG. 1 a catalytic reactor 1 in accordance with the present invention is illustrated. Catalytic reactor 1 is of cylindrical configuration and is provided with a mixing section 10 and a reaction section 12. Mixing section 10 functions to mix an oxygen containing gas which can be for example, oxygen or oxygen enriched air with a hydrocarbon containing gas such as natural gas. The resultant mixture is then reacted within reactant section 12. It is contemplated that catalytic reactor function at very high temperatures, pressures and through-put levels, namely, up to about 860° C., 40 barg and space velocities of up to 200,000 $hr^{-1}$. However, this is only for exemplary purposes and a reactor substantially in the form of catalytic reactor 1 could be used under less severe operating conditions.

Mixing section 10 is provided with an inlet 14 for introduction of the hydrocarbon containing gas into a mixing chamber 16 of mixing section 10. A known flow distributor 18 can be provided to distribute the hydrocarbon containing gas into mixing chamber 16. Flow distributor 18 can be in the form of a circular plate having openings suspended by legs 19 from a top flange 20. Top flange 20 can be connected by known threaded fasteners, not shown, to a bottom flange 22 in turn connected to a lower portion 24 of mixing section 10 to allow the mixing chamber 16 to be opened for maintenance purposes.

An oxygen injector 26 is also provided within mixing chamber 16 to inject the oxygen containing gas as streams indicated by arrowhead "A". Oxygen injector 26 is suspended from an inlet pipe 28 also connected to top flange 20 and passing through a notch-like recess (not shown) provided within flow distributor 18.

Figure 2:
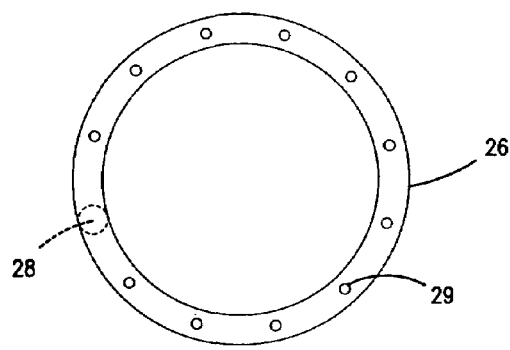
FIG. 2 is a bottom plan view of an oxygen injector for use within a mixing section of the catalytic reactor of FIG. 1.

With reference to FIG. 2 oxygen injector 26 is formed by a ring-like distributor having openings 29 to distribute the oxygen containing gas throughout mixing chamber 16. Other configurations, such as a cruciform arrangements of pipes, centrally connected and having openings is another possible configuration.

A flame arrestor 30 underlies oxygen injector 26 to prevent the formation of a stable flame prior to completion of the mixing of the oxygen and hydrocarbons and at a stage of mixing at which a flammable mixture is in fact formed. Preferably, flame arrestor 30 is formed from a metallic sponge material such as can be obtained from Porvair Advanced Materials at 700 Shepherd Street, Hendersonville, N.C., USA. Such materials have a very open structure and relatively small pore sizes from between about 10 and about 100 pores per 6.45 square centimeter, with pores that have diameters of less than 1 mm. Preferably, the material should have about 80 pores per 6.45 square centimeter and a pore diameter of about 0.25 mm. The material selected can be a high nickel alloy such as Inconel 600 or Hastelloy C-276. The sponge material will impart a flow pattern that is both radial and axial to help promote mixing in such directions.

While in certain flow regimes the flame arrestor being formed of a sponge material may be sufficient to mix the oxygen containing gas and the hydrocarbon containing gas. Flame arrestor 30 for the type of high flow-rate conditions for which catalytic reactor 1 is designed is preferably formed of six to twelve 2.54 centimeter layers (illustrated as six layers, 30a, 30b, 30c, 30d, 30e, and 30f) to allow baffle plates 32 to be placed between such section to further promote radial flow and enhance mixing of the oxygen and hydrocarbons. In the illustration, baffle plates 32 alternate between an annular type of plate deflecting the flow inwardly, toward a central opening thereof and a disk-like plate that deflects the flow outwardly around such disk-like plate. Other configurations are possible that act to deflect the flow and thereby enhance mixing. Additionally, it is possible for a layer of the flame arresting material of any type to be positioned above the point of oxygen injection.

Optionally, to promote yet even further mixing a static mixing element 34 can be provided to further mix the oxygen containing gas and the hydrocarbon containing gas. It is to be noted that there are many different types of static mixing elements that could function in the present invention and all are readily obtained from many different manufacturers. In any static mixer, baffle-like elements cause the mixture flow to change direction and thus, further mix together. It is to be pointed out that a suitable static mixer could be Chemineer's Kenics® static mixers, KM model series of North Andover, Mass., USA. Such static mixer is in the form of a cylindrical sleeve having inwardly projecting blade-like baffle elements to provide the enhanced mixing.

An optional feature is to provide instrument portals 35, 36 and 38 into which thermocouples and sampling ports can be provided to measure gas composition and temperature.

The reactants, after having been mixed as described above then flow into reaction section 12. Reaction section 12 includes an inner chamber 42 that contains a catalyst assembly 44 located within inner chamber 42. Inner chamber 42 can be formed from a steel alloy that is suitable for high temperature carburizing atmospheres such as RA 602 CA alloy obtainable from Rolled Alloys of Temperance, Mich., USA. Inner chamber 42 is not a pressure vessel but can be exposed to the high temperature and pressure levels and space velocities described above.

Figure 3:
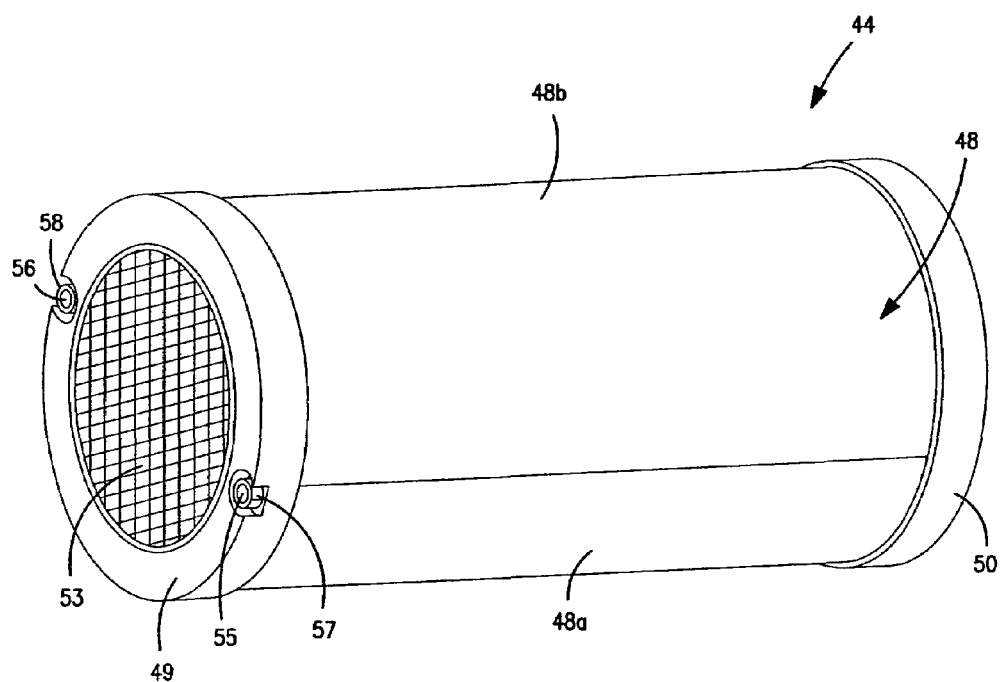
FIG. 3 is a perspective view of an assembly of a catalyst containing ceramic tube and fixture that is to be used in connection with the catalytic reactor shown in FIG. 1.

With reference to FIGS. 3 and 4, catalyst assembly 44 can contain a catalyst made of monolithic sections 46 of substantially cylindrical configuration that are retained within an assemblage formed of a removable ceramic tube 48 and a fixture that consists of end plates 49 and 50 of annular configuration and tie rods 51a and 51b that will be discussed in greater detail hereinafter. Preferably, at the top and bottom of the stack of monolithic catalyst sections 46, shielding blocks 53 are provided to retain heat within the catalyst. These are well known in the art and are typically fabricated from a ceramic such as alumina, cordierite or a metallic foam. The monolithic catalyst sections 46 are typically fabricated from cordierite or other high temperature material that supports a precious metal catalyst suitable for promoting the catalytic reactions of interest, for instance partial oxidation reactions of a hydrocarbon containing gas.

The ceramic tube 48 is preferably formed by two sections 48a and 48b which can be split along a longitudinal axis of such tube. In practice, monolithic catalyst sections 46 are positioned within one half of tube 48, for instance 48a, along with shielding blocks 53. The two sections 48a and 48b of tube 48 are then assembled. End plates 49 and 50 are then positioned at either end of the tube and tie rods 51a and 51b are screwed into end plate 50 by provisions of threaded ends 52 and 54. The threaded ends 55 and 56 of tie rods 51a and 51b are then extended through openings provided in end plate 49 and held in place by nuts 57 and 58 are threaded onto the tie rods to hold the end plates 49 and 50 in position. End plates 49 and 50 are provided with side walls 59 and 60, respectively, receive ends of halves 48a and 48b of tube 48 and thereby hold halves 48a and 48b in an assembled state as tube 48. With specific reference to FIG. 4, the lengthwise edges of each of the halves 48a and 48b of tube 48 is provided with an elongated recess of semicircular cross-section 62 along the lengthwise edges thereof to receive tie rods 51a and 51b nested within and between the lengthwise edges of halves 48a and 48b of tube 48. It is to be noted that end plates 49 and 50 could be designed to position tie rods 51a and 51b on the outside of tube 48, thereby retaining halves 48a and 48b of tube 48 together. However, this would be a less robust installation than that illustrated. Additionally, a tube that is not formed of half-sections is possible. However, such tube would be more difficult to load with the catalyst.

The entire assemblage of components as catalyst assembly 44 can then be inserted as a unit into inner chamber 42 with end plate 49 located at the top of inner chamber 42. As can be appreciated, this is advantageous because catalysts must be removed and replaced as a unit after the useful life of the catalyst has come to an end and is therefore, spent.

It is to be noted that ceramic tube 48 is preferably fabricated from Pyrolite available from Rex Materilas Group of Fowlerville, Mich., USA and can have a thickness of about 1.25 cm. Furthermore, a ceramic insulation blanket could be used that wrapped around the monolithic catalyst sections 46 and around catalyst assembly 44. It is to be further noted that while the foregoing assemblage is preferred, the embodiments of the present invention can be practiced without the use of such ceramic tube 48 and fixture components. In fact, the present invention contemplates that a pellet catalyst could be used in place of the monolithic catalyst illustrated and described herein.

A further advantage in catalytic reactor 1 is that the catalyst contained within monolithic catalyst sections 46 are isolated from an insulating material 60 that surrounds inner chamber 42. In many reactors, this is not the case and the insulation which is normally again formed of alumina degrades over time. Additionally, reactions between the reactants and the alumina can degrade the catalyst itself. The isolation provided by ceramic tube 48 and inner chamber 42 helps to prevent this. As can be appreciated, inner chamber 42 is not air tight and leakage can occur.

With specific reference again to FIG. 1, in order to retain the integrity of catalytic reactor 1, an outer pressure vessel 63 is provided to contain the insulation 64 and inner chamber 42. Preferably, the insulation 64 is a low density ceramic such as FIBERFRAX® LDS that can be obtained from Unifrax of Niagara Falls, N.Y., USA. Roughly 15 centimeter of such insulation in a reactor operating at about 860° C. should be sufficient to produce temperatures of less than about 200° C. on the outer surface of outer pressure vessel 63. Since the outer pressure vessel 63 is insulated from the inner chamber 42 where the reaction takes place, it can be fabricated from stainless steel such as 316 and 304. For high pressures of about 40 barg within outer pressure vessel 63, wall thickness of less than 2.54 cm are possible due to such relatively low operational temperatures. The bottom of the outer pressure vessel 63 can be filled with PLICAST® LWI 22 insulation 65 that is available from Plibrico Company of Chicago, Ill. USA which is hard cast ceramic that is more suitable to support the weight of inner chamber 42.

A set of flanges 66 and 68 are provided to connect reaction section 12 to mixing section 10 by threaded connectors, not shown in the drawing, but as well known in the art. Also, as well known, a high temperature gasket material can be provided to seal the connection between mixing section 10 and reaction section 12. Such gasket can be a FLEXITALLIC high temperature gasket available from Flexitallic Group Inc. of Houston Tex., USA. When the catalyst is to be removed or installed, flanges 66 and 68 are separated and the catalyst assembly 44 is simply removed.

Preferably, a platform 70, supported by supports 72, 74, and 76 is welded within pressure vessel 58 and L-like support sections 78 are in turn welded to platform 70 to support inner vessel 42. Although two support sections 78 are illustrated, three in practice are used, equally separated around inner chamber 44. Catalytic reactor 1 itself can be supported by a support 80 connected to outer pressure vessel 63.

An outlet 82 is provided to discharge a product gas as indicated by arrowhead "B". Outlet 82 includes frusto-conical section 84 set within outer pressure vessel 63, an elbow 86 and a straight section 88. This provides communication between inner chamber 42 and penetrates the outer pressure vessel 63. An outlet section 90 of pressure vessel 63 of cylindrical configuration is provided to enclose straight section 88. Outlet section 90 encloses a section of insulation 60 that also surrounds straight section 88. A connection flange 92 can be provided to connect catalytic reactor 1 to downstream processing equipment.

While the present invention has been described with reference to a preferred embodiment, as will occur to those skilled in the art, numerous, changes, additions and omissions may be made without departing from the spirit and scope of the present invention.

We claim:

1. A catalytic reactor comprising:
    a mixing section to mix an oxygen containing gas with a hydrocarbon containing gas and a reaction section connected to the mixing section to react the mixture of the oxygen containing gas and the hydrocarbon containing gas to produce a product;
    said mixing section including a mixing chamber having an inlet for the hydrocarbon containing gas, an oxygen injector located within the mixing chamber for injecting the oxygen containing gas into the hydrocarbon containing gas and a flame arrestor located at least below the oxygen injector;
    the flame arrestor being formed of a mass of porous material that permits mixing in both radial and axial directions of said mixing chamber to promote mixing of the oxygen containing gas and the hydrocarbon containing gas and the flame arrestor in contact with the walls of said mixing chamber such that flow of said oxygen containing gas and said hydrocarbon containing gas is constrained to pass through said flame arrestor before entering the reaction section; and
    said reaction section including an inner chamber positioned to receive the mixture of the oxygen containing gas and the hydrocarbon containing gas, a catalyst located within said inner chamber to promote the reactions involving said mixture, an outer pressure vessel, thermal insulation between said inner chamber and said outer pressure vessel and an outlet penetrating the outer chamber and in communication with the inner chamber to discharge a product gas containing the product.

2. The reactor of claim 1, wherein said flame arrestor is fabricated from a metallic foam monolith.

3. The reactor of claim 2, wherein said metallic foam monolith consists of layers of said metallic foam monolith and said mixing chamber further has baffle elements located between said layers to further promote mixing of the oxygen containing gas and the hydrocarbon containing gas.

4. The reactor of claim 1, wherein said oxygen injector comprises an inlet pipe projecting into said mixing chamber and a circular distributor having openings to discharge the oxygen containing gas.

5. The reactor of claim 1, further comprising a static mixer located below the flame arrestor.

6. The reactor of claim 1, wherein the catalyst comprises a stack of monolithic blocks located within an assemblage comprising a ceramic tube and a fixture to retain the stack of monolithic blocks within the ceramic tube as a single unit so that the assemblage can be installed and retrieved from the inner vessel as a single unit.

7. The reactor of claim 6, wherein the catalyst is of substantially cylindrical configuration and the fixture comprises two opposed end plates of annular configuration and tie rods connecting said two opposed end plates, the end plates sized to retain the ceramic tube between the end plates and therefore the stack of monolithic blocks within the ceramic tube and between the end plates.

8. The reactor of claim 7, wherein the ceramic tube is separable along its length to facilitate forming the stack of the monolithic blocks and the attachment of the end plates by the tie rods.

9. The reactor of claim 8, wherein said flame arrestor is formed by layers of metallic foam monolith and said mixing chamber further has baffle elements located between said layers to promote mixing of the oxygen containing gas and the hydrocarbon containing gas.

10. The reactor of claim 9, further comprising a static mixer located below the flame arrestor.

\* \* \* \* \*